July 19, 1932. W. F. STREHLOW 1,868,474
TRACTOR
Filed Nov. 24, 1930 6 Sheets-Sheet 2

Inventor
W. F. Strehlow
by
Attorney

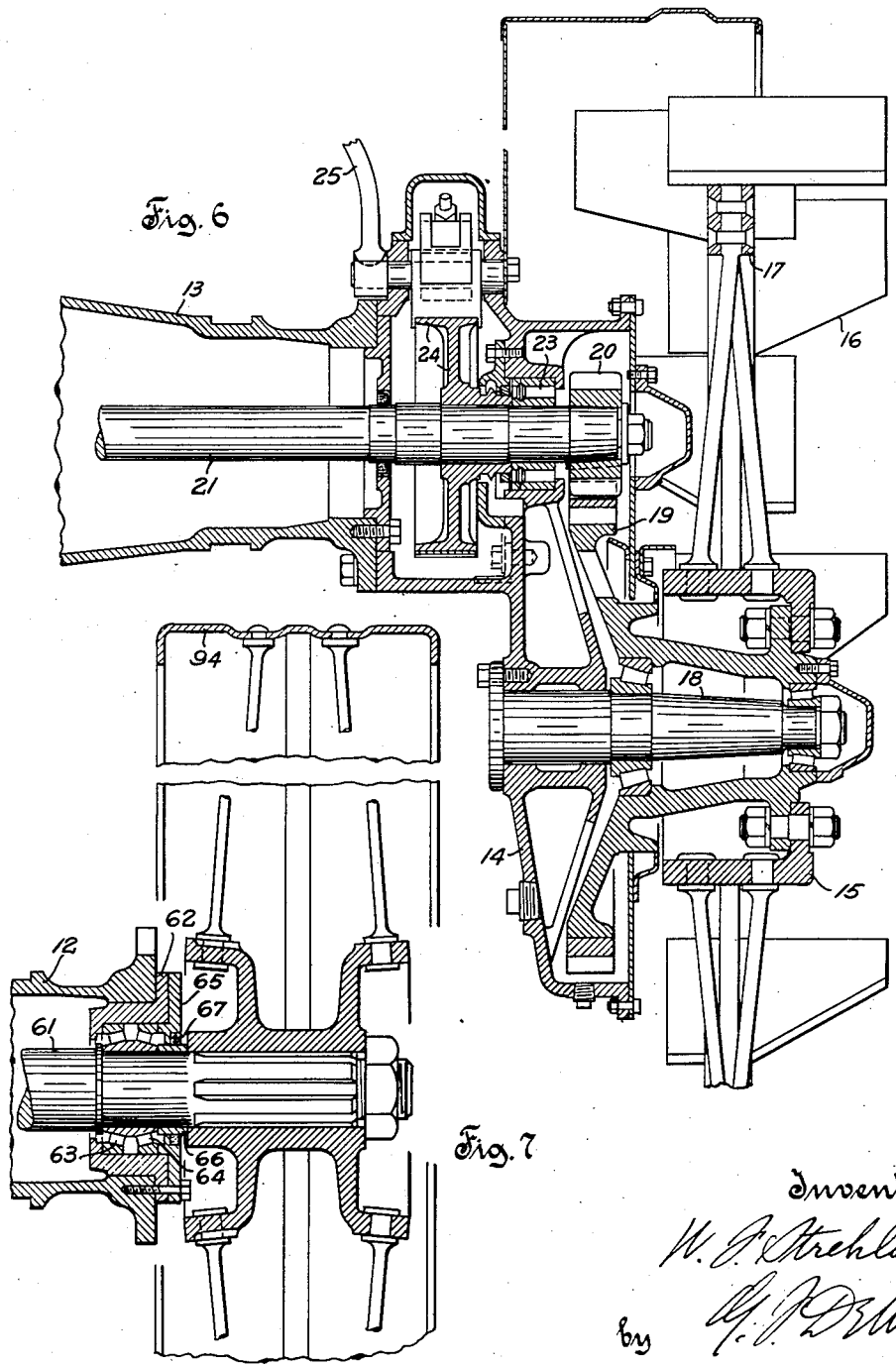

July 19, 1932. W. F. STREHLOW 1,868,474
TRACTOR
Filed Nov. 24, 1930   6 Sheets-Sheet 6
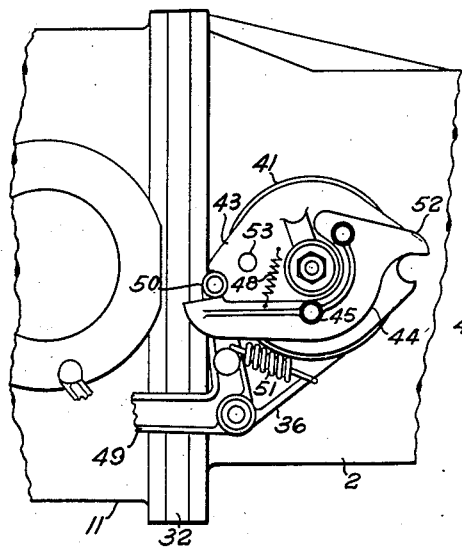
Fig. 8
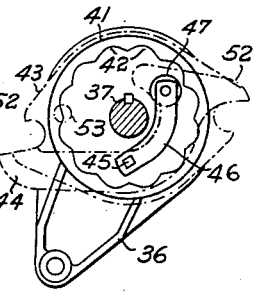
Fig. 9
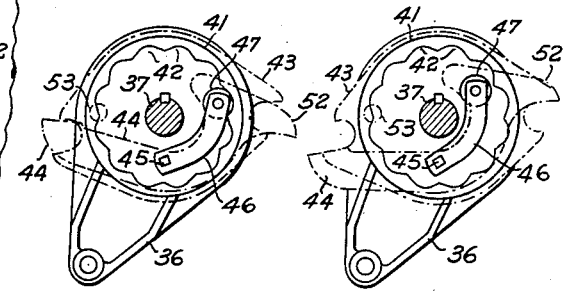
Fig. 10
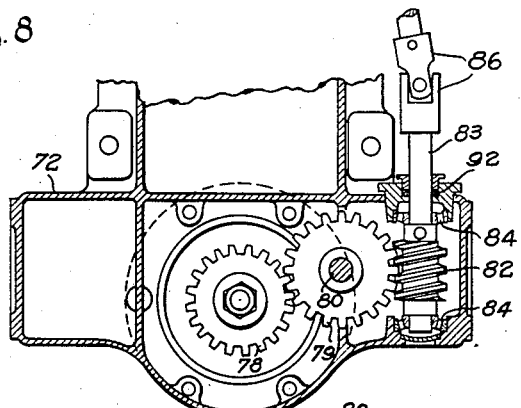
Fig. 12
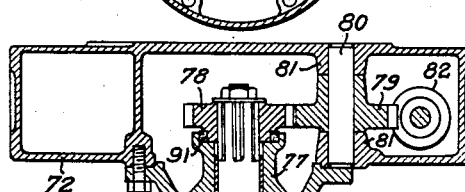
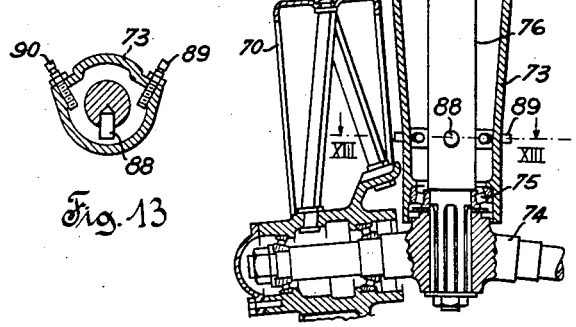
Fig. 13
Fig. 11
Inventor
W. F. Strehlow
by
Attorney Patented July 19, 1932

1,868,474

UNITED STATES PATENT OFFICE

WALTER F. STREHLOW, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

TRACTOR

Application filed November 24, 1930. Serial No. 497,854.

This invention relates to improvements in tractors and has particular relation to mechanism for adapting a standard four wheel tractor to soil working operations and other farm purposes.

One of the objects of the invention is the provision of means whereby the ground clearance of the standard tractor, that is the distance between the ground and the main body of the tractor, is increased so that the tractor may be driven over fields of growing plants without injury to the latter. The invention contemplates to accomplish this result by replacing the front and rear wheels of the standard tractor with wheels whose center of rotation is substantially lower, relative to the main body of the tractor, than the axes of the standard tractor wheels, and which are particularly adapted to field work.

With this object in view the problem involved consists primarily in the provision of suitable supporting means for the substitute wheels and in the provision of a suitable mechanism for transmitting power from the power plant of the standard tractor to the relocated rear wheels. In the solution of this problem it has been found desirable to avoid, as far as possible, changes in the standard tractor parts, and to design the new parts, which are to be added to the standard tractor, in such a manner that they can take the place of certain parts which are to be removed from the standard tractor or at least easily attached to the standard tractor parts.

Among the substitute parts which appear in the tractor embodying the present invention is a front wheel steering truck adapted to be attached to the front end of the standard tractor.

This steering truck may be designed in any suitable manner, but preferably comprises an upper hollow portion enclosing a plurality of operating gears, and a downwardly extending tubular portion surrounding a vertical steering column as will be described more fully hereinafter in connection with the drawings. The preferred construction of the steering truck and its associated parts as disclosed herein have been made the subject matter of a divisional application.

The substitute rear wheels are supported on a pair of final drive gear casings so designed as to be easily attachable to the rear axle housing of the standard tractor. The mechanism for transmitting power to the relocated rear wheels includes a differential gear adapted to be disposed in the differential housing of the standard tractor, and certain power transmitting elements housed within the rear portion of the standard transmission casing.

Another object of the invention is to provide a slowly revolving power take-off mechanism whose driving elements are enclosed within a casing adapted to be filled with oil. This power take-off mechanism is chiefly intended to be used for lifting and lowering the earth working tools of agricultural implements associated with the tractor. Such implements have been more fully disclosed in two applications of the present inventor, filed contemporaneously herewith.

These and other objects and advantages of the invention will be apparent from the following description. A clear conception of an embodiment of the invention and of the operation of a device constructed in accordance therewith, may be had by referring to the drawings accompanying and forming a part of this specification, in which like reference characters designate the same or similar parts in the several views.

Fig. 6 is a section on line VI—VI of Fig. 1.

Fig. 7 is a view similar to Fig. 6 but showing a standard rear wheel and its supporting means.

Fig. 8 is a partial side elevation of the standard tractor body, showing the external parts of the power take-off mechanism.

Figs. 9 and 10 are detail views of clutch members associated with the power take-off mechanism.

Fig. 11 is a section on line XI—XI of Fig. 2.

Fig. 12 is a sectional top view of the steering mechanism.

Fig. 13 is a section on line XIII—XIII of Fig. 11.

Figure 5:
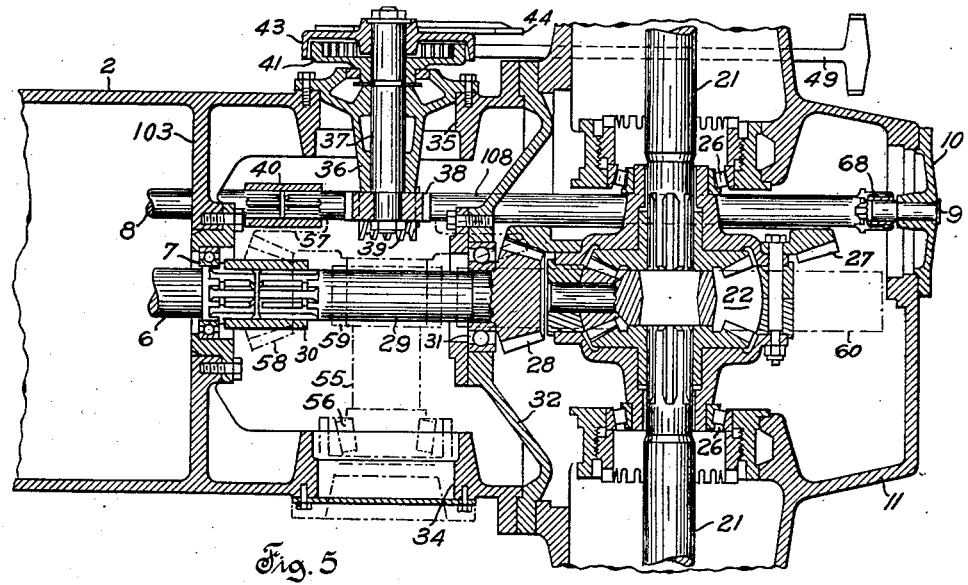
Fig. 5 is a horizontal section through the tractor rear end, substantially on line V—V of Fig. 1.

The numeral 1 indicates, generally, the motor crank case of the standard tractor, which is associated with a standard transmission casing 2. The usual clutch and shifting gear enclosed within the transmission casing are of well known design and operated by a clutch pedal 3 and a gear shift lever 4 shown in Fig. 2. A power take-off pulley 5 is associated with a forward portion of the transmission casing 2 and driven by any suitable gears which, forming part of the standard tractor, do not require any further description in connection with the present invention. The change speed shaft, that is the shaft whose speed and direction of rotation are controlled by shifting the gears of the speed changing mechanism, is indicated in Figs. 4 and 5 by the numeral 6, and has its rear end supported by a ball bearing 7 mounted in a web 103 of the transmission casing. A power take-off shaft indicated by 8 also belongs to the parts employed in the standard tractor and is operatively connected with the motor by any suitable means, preferably by permanently meshing gears, which, however, are not shown in the drawings. Detachably connected to the power take-off shaft 8 by means of a splined muff coupling 40 is an extension shaft 108 whose rear end is rotatably supported on a pin 9 mounted in a cap 10 which is detachably secured to a rearward portion of a differential housing 11. The differential housing is a part of the standard tractor and has lateral extensions 12 and 13 adapted to enclose the standard rear axles. Secured to the outer end of each extension 12 and 13 is a final drive gear casing 14 (Fig. 6) adapted to support a tractor rear wheel 15 having its center of rotation substantially below the center of the extensions 12 and 13. The rear wheels 15 are of a design particularly adapted for field work in that they are provided with cleats 16 secured to a narrow outer rim 17. The hub of each of the wheels 15 is supported by means of roller bearings cooperating with a stub shaft 18 which is mounted in a lower portion of the final drive gear casing 14. A spur gear 19 associated with each of the rear wheels is enclosed within the final drive gear casing 14 and meshes with a pinion 20 keyed on the outer end of a shaft 21. The inner end of each shaft 21 is operatively connected to a differential gear 22 enclosed within the differential housing 11. The outer ends of the shafts 21 are supported by roller bearings 23 fitted to the final drive gear casings 14, and a brake mechanism, including a brake drum 24, is associated with each of the shafts 21 and operable by a hand lever 25 (Fig. 3) in order to facilitate short turning of the tractor. The differential gear 22 is rotatably supported within the housing 11 by roller bearings 26 which are fitted to suitable internal portions of the differential housing. A bevel gear 27 associated with the differential gear 22 and disposed coaxially with the shafts 21 meshes with a bevel pinion 28 formed at the end of a shaft 29 whose forward end is connected to the change speed shaft 6 by means of an internally splined muff coupling 30. The rear end of the shaft 29 is rotatably supported, adjacent to the bevel pinion 28, by a ball bearing 31 mounted in a vertical bearing plate 32. The bearing plate has a circumferential portion whose front face is fitted accurately to the flanged rear end of the standard transmission casing 2, and whose rear face is fitted accurately to the front opening of the differential housing 11. The transmission casing 2, the bearing plate 32 and the differential housing 11 are securely held together by bolts 33 as shown in Fig. 4.

Figure 2:
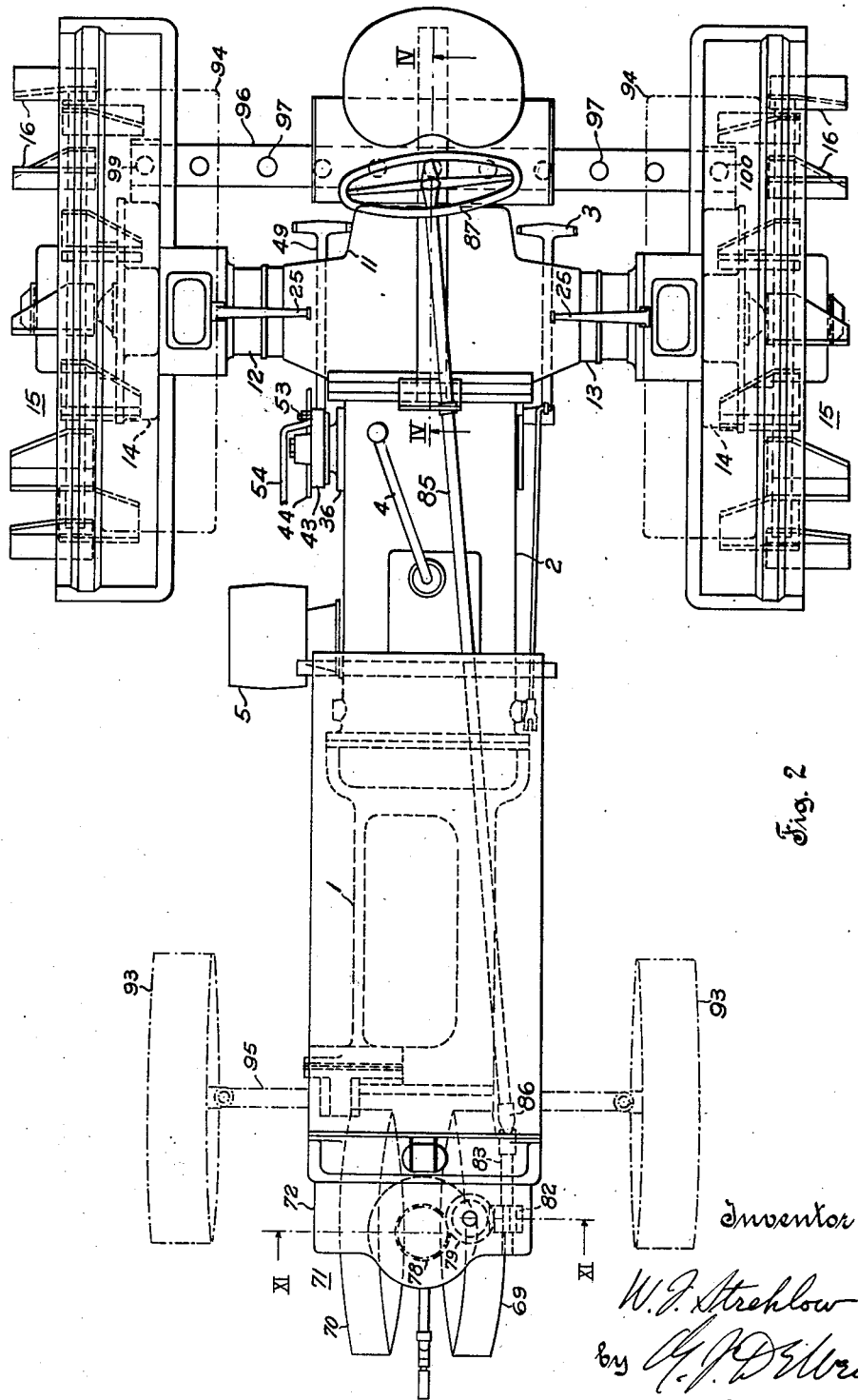
Fig. 2 is a top elevation of the tractor shown in Fig. 1.

A pair of oppositely disposed holes 34 and 35 is provided in the side walls of the rear portion of the standard transmission casing 2. One of these holes—which in the standard tractor serve a certain purpose to be described later—is used, according to the invention, as an opening through which to drive a power take-off member outside of the transmission casing 2. In order to accomplish this result the hole 35 is fitted with a bearing 36 for a power take-off shaft 37 disposed at right angles to the power take-off shaft extension 108 and operatively connected thereto by means of a worm gear 38 and a worm 39 which is securely held on the shaft extension 108. Associated with the outer end of the shaft 37 is an intermittent clutch of the internal pawl and ratchet type, similar to the one disclosed in the United States Patent 1,561,611 granted to A. C. Lindgren. A clutch element 41 having internal notches 42 (Figs. 9 and 10) around its periphery is securely mounted on the shaft 37. A second, normally stationary clutch element 43 is rotatably mounted on the shaft 37 in cooperative relation with the clutch element 41. A lever 44 is securely mounted on a pin 45 which in turn is rotatably held by the clutch element 43 and has a square portion projecting inwardly therefrom. Mounted on the square portion of the pin 45 is a roller arm 46 carrying at its outer end a roller 47 which may be brought into and out of engagement with the notches 42 of the clutch member 41 by swinging the lever 44 around the center of the pin 45. A spring 48, shown in Fig. 8, tends to hold the lever 44 and the roller arm 46 in the position shown in Fig. 9, in which position the roller 47 engages one of the notches 42. A trip lever 49 is pivotally mounted on a downwardly extending portion of the bearing 36 and has an upwardly extending arm on which a roller 50 is mounted. The roller 50 is held in engagement with the outer peripheral portion of the clutch element 43 and with the lever 44 by a spring 51, (Fig. 8) and may be brought out of engagement with these parts by the operator of the vehicle who, for this purpose, has to step upon the end of the rearwardly extending arm of the trip lever 49 (Fig. 2). In Fig. 8 the lever 44 and the clutch element 43 are held by the roller of the trip lever in a relative position such as to keep the roller 47 out of engagement with the notches 42. This is more clearly shown in Fig. 10. In operation, the power take-off shaft 8 and its extension 108 will be permanently rotated by the motor of the tractor and drive the shaft 37 through the worm and gear at a comparatively low speed. Together with the shaft 37 the clutch element 41 will be permanently rotated. The direction of rotation of the shaft 8 will be such that the clutch element 41 in Figs. 8, 9 and 10 rotates in a clockwise direction. When the operator of the tractor steps on the rear end of the trip lever 49 the roller 50 will be brought out of engagement with the lever 44 and the latter will move under the action of the spring 48 relative to the clutch element 43 into the position shown in Fig. 9. This will cause the roller 47 to engage one of the notches 42, and the clutch element 43 together with the lever 44 will then be rotated in a clockwise direction around the center of shaft 37. The operator will release the trip lever immediately after the clutch element 43 has started to rotate, whereupon the roller 50 will ride on the circumferential portion of the clutch element 43. After the clutch element 43 has traveled through an angle of approximately 180° the extension 52 of the lever 44 will hit the roller 50 and force the lever 44 to rotate against the action of spring 48 around the center of pin 45 so as to bring the roller 47 out of the notch 42 which had been engaged. The clutch member 43 will thus be stopped automatically after a half revolution, and in order to start it again the operator has to push down the rear end of the trip lever 49 as before. Mounted on the clutch member 43 and laterally extending therefrom is a pin 53 to which a power lift link 54 of an agricultural implement may be connected.

The purpose which is served by the holes 34 and 35 in the standard tractor is the following: The differential gear 22 and its associated shafts 21, the shaft 29 and the bearing plate 32 are not used in the standard tractor. The differential housing 11 is bolted directly to the flanged rear end of the transmission casing 2, and a cross shaft 55 is supported by roller bearings 56 which are mounted in the holes 34 and 35. In Fig. 5 only one of these roller bearings has been shown while the other, the two being exactly alike, has been omitted for clearness sake. Mounted on the cross shaft 55 is a bevel gear 57 which meshes with a bevel pinion 58 secured to the change speed shaft 6. The cross shaft 55 also carries a spur gear 59 securely fastened thereto and adapted to mesh with a spur gear 60 associated with the differential gear of the standard tractor. The spur gears 59 and 60 are not shown in mesh with each other in Fig. 5 because, in this figure, the distance between the cross shaft 55 and the axis of the differential housing is greater than in the standard tractor due to the insertion of the bearing plate 32. The rear wheels of the standard tractor are supported by a pair of alined shafts associated with the standard differential gear which is enclosed within the housing 11. The outer end of one of these shafts, indicated by 61, and a standard rear wheel 94 supported thereby have been shown in Fig. 7. A flanged bushing 62 is fitted to the outer end of the housing extension 12 and provides a support for two roller bearings 63 and 64 cooperating with the shaft 61. The outer roller bearing 64 is retained by a plate 65, and the joint between this plate and a sleeve 66 on the shaft 61 is sealed by a felt packing 67. It will be seen that the final drive gear casing 14 and its associated parts may be conveniently attached to the housing extension 12 after the shaft 61 and the bushing 62 have been removed therefrom. The rear end of the shaft extension 108 has a splined portion 68 (Figs. 4 and 5) which may be used for the attachment of another shaft extension when it is desired to take off power at the rear end of the tractor. In the standard tractor the cap 10 is of somewhat different design to take care of the slightly different relation between the end of shaft 108 and the wall of housing 11, as the bearing plate 32 is omitted in the standard tractor and the shaft 108 will project somewhat farther into the opening at the rear end of the transmission housing.

Figure 1:
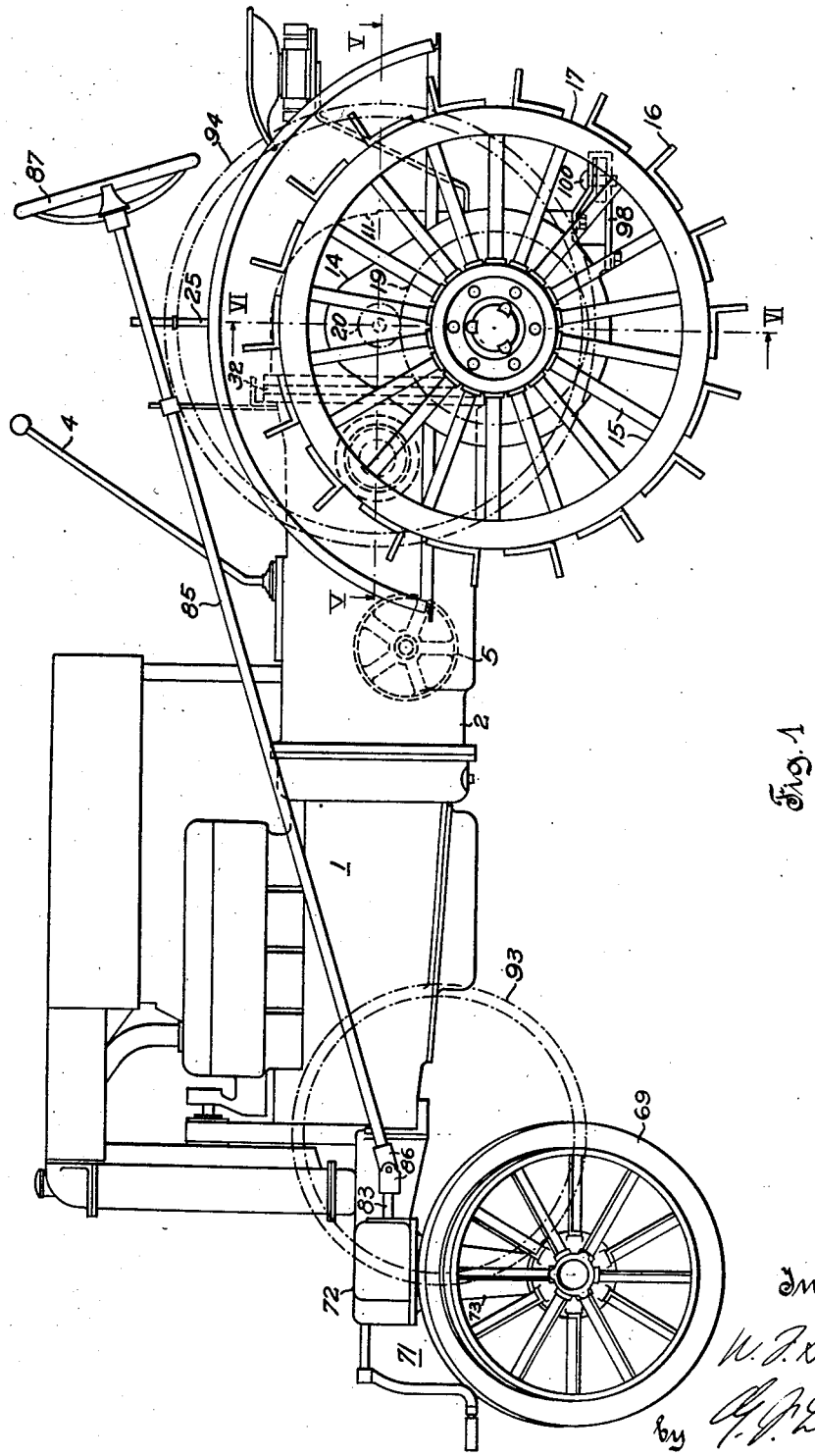
Fig. 1 is a side elevation of a tractor comprising a standard main body supported on wheels especially adapted for field work, the location of the standard tractor wheels being indicated in dash dotted lines.
Figure 3:
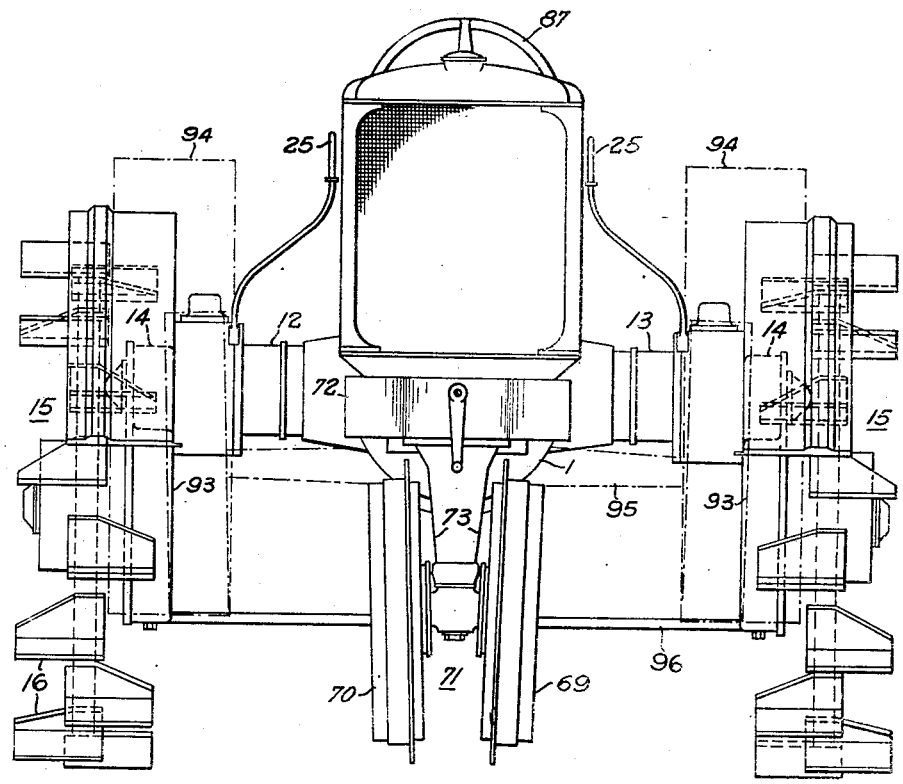
Fig. 3 is a front elevation of the tractor shown in Figs. 1 and 2.
Figure 4:
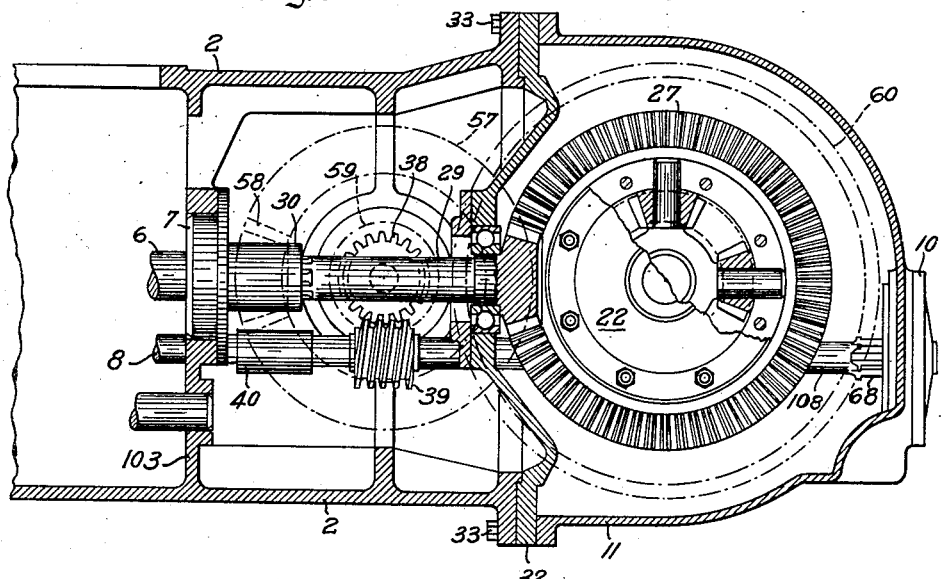
Fig. 4 is a section on line IV—IV of Fig. 2, speed reducing gears used in the standard tractor being indicated in dash dotted lines.

The front end of the tractor shown in Figs. 1, 2 and 3 is supported by a pair of closely adjacent front wheels 69 and 70 associated with a steering truck 71 which is secured to the front end of the motor crank case 1. The steering truck comprises an upper, forwardly extending casing 72 and a tubular member 73 extending downwardly from a forward portion of the casing 72. The wheels 69 and 70 are rotatably mounted on an axle 74 which has a central hub portion projecting upwardly into the lower end of the tubular number 73. A roller bearing 75 fitted to the lower end of the tubular member cooperates with the upwardly extending hub portion and permits the front axle to be rotated about the vertical axis of the tubular member 73. A vertical spindle 76 secured at its lower end to the hub portion of the front wheel axle extends upwardly through the tubular member and is journaled in a bearing portion 77 at the upper end thereof. The spindle projects into the casing 72 of the steering truck, and splined on its upper end is a toothed gear 78 which meshes with a worm gear 79 rotatably mounted on a vertical shaft 80 whose ends are secured in suitable lugs 81 formed on the upper and lower walls of the casing 72. A worm 82 meshing with the worm gear 79 is securely mounted on a horizontal worm shaft 83 which is rotatably supported within the casing 72 by means of conical roller bearings 84. These bearings are arranged so as to take up axial thrust of the worm shaft in both directions. The rear portion of the worm shaft projects through the rear wall of the casing 72 and is connected to a steering column 85 by means of a universal joint 86. When the operator of the vehicle turns the hand wheel 87, which is provided at the end of the steering column, to the right the worm 82 will rotate the worm gear 79 in Fig. 12 in an anti-clockwise direction while the toothed gear 78 and with it the spindle 76 will be rotated in a clockwise direction. This will cause the front wheels 69 and 70 to be turned to the right and the tractor will thus be steered in this direction. In the same manner the tractor will be steered to the left when the hand wheel 87 is turned by the operator to the left. The angle through which the spindle 76 may be turned is limited by a stud 88 (Fig. 13) which projects from the spindle 76 and cooperates with either one of the set screws 89 or 90 which are held in a suitable position on the tubular member 73.

The worm and the gears 78 and 79 are preferably immersed in lubricant, and the upper end of the tubular member 73 is designed so as to seal the opening in the bottom of the casing 72. A packing 91 seals the joint between the bearing portion 77 and the toothed gear 78. Another packing 92 is provided to seal the joint between the shaft 83 and the casing 72.

The standard tractor front wheels shown in dash dotted lines and indicated by the numeral 93 are supported by an axle 95. This axle is mounted on a bracket of such shape and design that it can be easily interchanged with the front steering truck 71. From an inspection of Figs. 1 and 3 it will be apparent that the tractor equipped with the front wheels 69 and 70 and the rear wheels 15 has a substantially greater ground clearance than the standard tractor which is equipped with the front wheels 93 and the rear wheels 94. The arrangement of the rear wheels 15 and of the front wheels 69 and 70 is such that when the tractor is used for cultivating or similar farm work, the rear wheels 15 may straddle two plant rows while the closely adjacent front wheels 69 and 70 may travel in the space between these two rows. It will also be noted that the lateral spacing of the rear wheels 15 is wider than the spacing of the standard rear wheels 94. A drawbar 96 to which earth working implements may be hitched is provided at the rear end of the tractor. This drawbar has a series of holes 97 and is supported by brackets 98 bolted to the final drive gear casing 14, as best shown in Fig. 1. Pins 99 and 100 inserted into suitable holes of the brackets 98 hold the drawbar in place and permit the drawbar to be easily attached or removed from the tractor. After the pins 99 and 100 have been taken out the drawbar may be shifted transversely and thus be removed conveniently from the brackets.

It should be understood that it is not intended to limit the invention to the exact details of construction herein shown and described, for various modifications within the scope of the claims may occur to persons skilled in the art.

It is claimed and desired to secure by Letters Patent:

1. A tractor having in combination, a pair of traction wheels, a pair of alined drive shafts extending therebetween and disposed substantially above the axis of said traction wheels, a speed reducing driving connection between said drive shafts and said wheels, a differential gear associated with said shafts, a differential housing enclosing said differential gear, a casing associated with said differential housing and having oppositely disposed holes adapted to receive bearing means for a cross shaft parallel to said drive axles, and a power driven shaft member operatively connected to said differential gear and extending therefrom into said casing, said differential housing and said casing being designed to be used in a standard tractor having a pair of standard traction wheels coaxially connected to a pair of standard drive axles, a standard differential gear associated with said standard drive axles, and multiple speed changing means cooperating with said standard differential gear, said multiple speed changing means including a cross shaft mounted in bearings fitted to the oppositely disposed holes of said casing.

2. A tractor having a pair of alined drive axles, a differential gear associated with said axles and enclosed within a differential housing, a casing associated with said differential housing and having oppositely disposed holes adapted to receive bearing means for a cross shaft parallel to said drive axles, and a shaft member operatively connected to said differential gear and extending therefrom into said casing for connection to a source of power, said differential housing and said casing being designed to be used in a standard tractor having a standard differential gear operatively connected to multiple speed changing means enclosed within said casing, and having a cross shaft associated with said speed changing means and mounted in bearings fitted to the oppositely disposed holes of said casing.

3. A tractor having a pair of alined drive axles, a differential gear associated with said axles and enclosed within a differential housing, a casing detachably connected to said housing and having oppositely disposed holes adapted to receive bearing means for a cross shaft parallel to said drive axles, a shaft member operatively connected to said differential gear and extending therefrom into said casing for connection to a source of power, and a removable support for said shaft member cooperating therewith near said differential gear, said differential housing and said casing being designed to be used in a standard tractor having a standard differential gear operatively connected to muliple speed changing means enclosed within said casing, and having a cross shaft associated with said speed changing means and mounted in bearings fitted to the oppositely disposed holes of said casing.

4. In a tractor having a selective speed changing mechanism and a differential gear for transmitting power from a motor to a pair of drive axles, a transmission casing embodying a front portion enclosing said selective speed changing mechanism and a rear portion having oppositely disposed holes adapted to receive bearing means for a cross shaft parallel to said drive axles, and a shaft member for transmitting motive power from said speed changing mechanism to said differential gear, disposed within said rear portion, said transmission casing being designed to be used in a standard tractor having a standard differential gear operatively connected to said selective speed changing mechanism through the medium of multiple speed changing means enclosed within said rear portion, and having a cross shaft associated with said multiple speed changing means and mounted in bearings fitted to the oppositely disposed holes of said transmission casing.

5. A tractor having a motor, a pair of alined drive axles, means whereby power is transmitted from said motor to said drive axles, including a differential gear enclosed within a differential housing, a casing associated with said differential housing and having oppositely disposed holes adapted to be fitted with bearings for a cross shaft parallel to said drive axles, a shaft member operatively connected to said differential gear and extending therefrom into said casing for driving connection with said motor, a bearing mounted in one of said oppositely disposed holes, a power take-off shaft journaled in said bearing and disposed parallel to said drive axles, and means whereby power is transmitted from said motor to said power take-off shaft, said differential housing and said casing being designed to be used in a tractor having a standard differential gear operatively connected to multiple speed changing means enclosed within said casing, and having a cross shaft associated with said speed changing means and mounted in bearings fitted to the oppositely disposed holes of said casing.

6. A tractor having a motor, a pair of alined drive axles, means including a differential gear whereby power is transmitted from said motor to said drive axles, a housing for said differential gear, a casing associated with said housing and having an outer wall extending therefrom, a bearing associated with said wall and having its axis disposed parallel to said drive axles, a power take-off shaft journaled in said bearing and projecting therefrom at both ends, a worm gear mounted on the inner end of said power take-off shaft, a worm element cooperating with said worm gear, a driving connection between said worm element and said motor, and a shaft member driven by said motor and operatively connected to said differential gear and extending therefrom into said casing.

7. A tractor having a motor, a pair of alined drive axles, means including a differential gear whereby power is transmitted from said motor to said drive axles, a housing for said differential gear, a casing associated with said housing and having an outer wall extending therefrom, a bearing associated with said wall and having its axis disposed parallel to said drive axles, a power take-off shaft journaled in said bearing and projecting therefrom at both ends, a worm gear mounted on the inner end of said power take-off shaft, a worm element cooperating with said worm gear, a supporting shaft for said worm element in driving connection with said motor, and supporting means for the rear end of said worm-supporting shaft, detachably connected to a rearward portion of said differential housing so as to permit attachment of power take-off means to the rear end of said worm-supporting shaft after removal of said rear supporting means.

In testimony whereof, the signature of the inventor is affixed hereto.

WALTER F. STREHLOW.